United States Patent [19]

Hockaday

[11] Patent Number: 5,073,002
[45] Date of Patent: Dec. 17, 1991

[54] SELF ALIGNING PIGTAIL

[76] Inventor: Bruce D. Hockaday, 124 Merline Rd., Vernon, Conn. 06066

[21] Appl. No.: 621,097

[22] Filed: Nov. 30, 1990

[51] Int. Cl.⁵ .................................................. G02B 6/30
[52] U.S. Cl. ........................................ 385/49; 385/50; 385/52
[58] Field of Search .............. 350/96.17, 96.12, 96.15, 350/96.2

[56] References Cited

U.S. PATENT DOCUMENTS

| | | | |
|---|---|---|---|
| 4,744,619 | 5/1988 | Cameron | 350/96.17 |
| 4,836,645 | 6/1989 | Leferve et al. | 350/96.17 |
| 4,976,506 | 12/1990 | Pavlath | 350/96.17 |

Primary Examiner—John D. Lee
Assistant Examiner—John Ngo
Attorney, Agent, or Firm—Richard H. Koskawski

[57] ABSTRACT

A method of aligning the optical axis in the core of an optical fiber with the optical axis in a waveguide imbedded in an integrated optical (IO) chip includes the step of coating an end face of the fiber with a layer of solder such that the solder coating covers the cladding portio of the fiber without covering the core portion of the fiber. The IO chip has a block of similar IO material mounted to a surface of the chip such that a planar end face of the chip is aligned with a planar end face of the block. The end faces of the block/chip are coated with a layer of solder such that the solder coating covers the entire end face of the block/chip without covering the waveguide. The coated fiber end face is brought in contact with the solder coated end face of the block/chip such that the core and waveguide are in approximate axial alignment. The solder layers on the fiber and blockchip end faces are then melted whereby the resulting surface tension forces are such that the optical axes of the core and waveguide are in precise alignment.

18 Claims, 2 Drawing Sheets

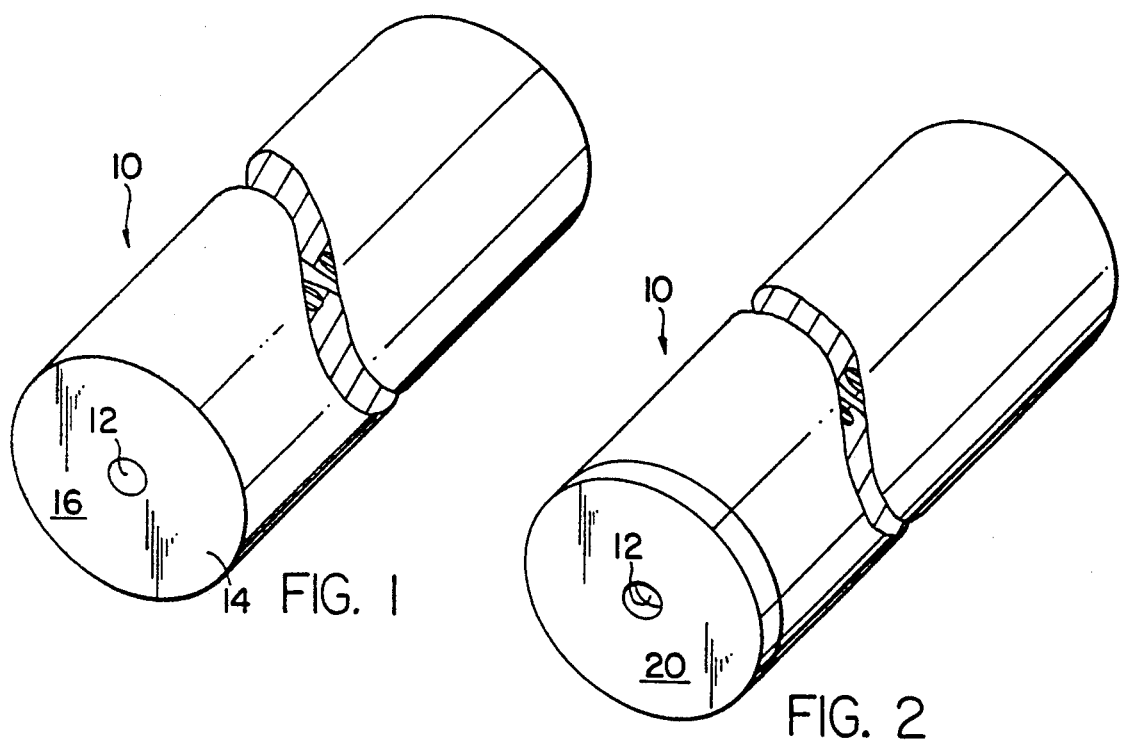
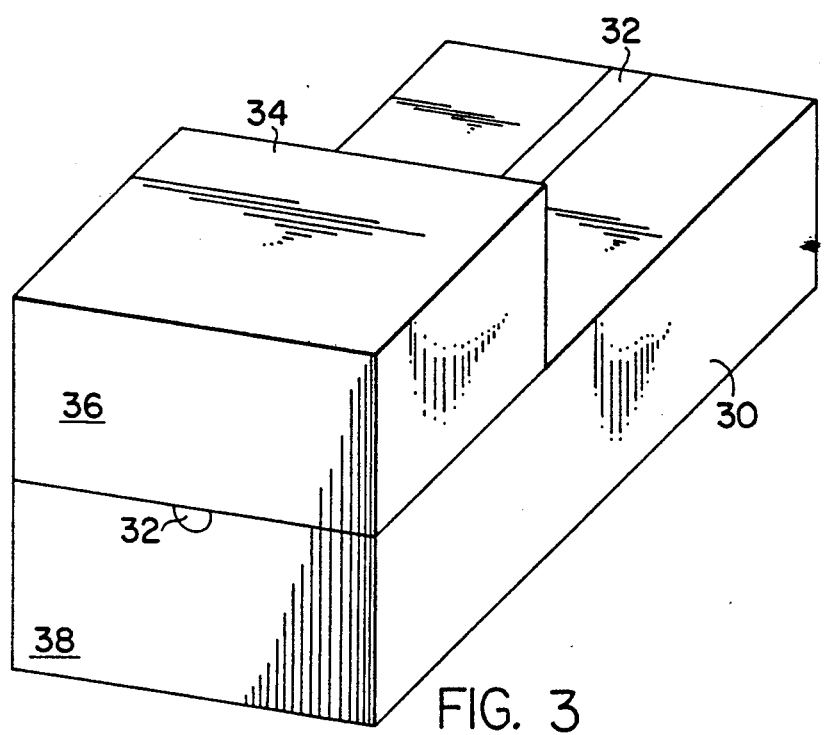

SELF ALIGNING PIGTAIL

DESCRIPTION

1. Technical Field

This invention relates to integrated optics, and more particularly to the alignment and connection of an optical fiber to a waveguide in an integrated optic chip.

2. Background Art

In the art of mounting of optical fibers to integrated optic (IO) chips, it is critical that the waveguide formed or imbedded in the IO chip be in precise alignment with the fiber before affixing the fiber to the chip. Due to the typically small diameters (e.g., 0.005 to 0.01 mm) of both the fiber and waveguide, a small amount of misalignment therebetween may result in significant coupling loss of optical energy.

It is known in the prior art to use support blocks with V-grooves formed therein to support the fiber and provide a coarse lateral and angular alignment of the fiber and waveguide. However, this approach does not provide the desired precise alignment of the fiber and waveguide before the two are affixed together.

It is also known in the prior art to affix a support block to the IO chip and attach the fiber with adhesive to both the chip and block. An illustration of this is in U.S. Pat. No. 4,744,619 to Cameron. However, this method is inefficient in achieving the required precise optical alignment between the fiber and IO chip before affixation of the fiber to the chip. This is because Cameron teaches the use of elaborate micropositioner and imaging equipment apparatus for achieving alignment. The use of external positioners has a further drawback in that the positioner does not allow simultaneous positioning of closely spaced optical fibers at the output of the IO chip. Additionally, the use of external positioners is labor and capital intensive.

DISCLOSURE OF INVENTION

Objects of the present invention include the provision of a method for attaching an optical fiber to an IO chip such that the optical axes of the fiber and a waveguide on the IO chip are in precise alignment due to surface tension forces during a soldering step in the method.

According to the present invention, a method of aligning the optical axis in the core of an optical fiber with the optical axis in a waveguide imbedded in an integrated optical chip and of attaching the fiber to the chip includes the step of coating an end face of the fiber with a layer of solder such that the solder coating covers the cladding portion of the fiber without covering the core portion of the fiber; the integrated optical chip has a block of similar integrated optical material mounted to a surface of the chip such that a planar end face of the block is aligned with a planar end face of the chip; the end faces of the block/chip are coated with a layer of solder such that the solder coating covers the entire end face of the block/chip without covering the waveguide in the chip; the solder coated fiber end face is then brought in contact with the solder coated end face of the block/chip such that the core and waveguide are in approximate axial alignment; the solder layers on the fiber and block/chip end faces are then melted whereby the resulting surface tension forces are such that the optical axes of the core and waveguide are in precise alignment.

The method of the present invention has utility in achieving alignment of an optical fiber to a waveguide in an IO chip without the use of prior art external positioning equipment and apparatus to measure the optical transmission through the fiber/IO chip connection. The present invention is also inexpensive and time-saving, key factors in being able to produce IO devices such as fiber optic gyros in large quantities on a commercial basis.

These and other objects, features and advantages of the present invention will become more apparent in light of the detailed description of a best mode embodiment thereof, as illustrated in the accompanying drawing.

BRIEF DESCRIPTION OF DRAWING

FIG. 1 is a perspective illustration of an optical fiber;

FIG. 2 is a perspective illustration of the optical fiber of FIG. 1 having an end face coated with solder;

FIG. 3 is a perspective illustration of an IO chip having a block mounted thereon;

BEST MODE FOR CARRYING OUT THE INVENTION

Figure 4:
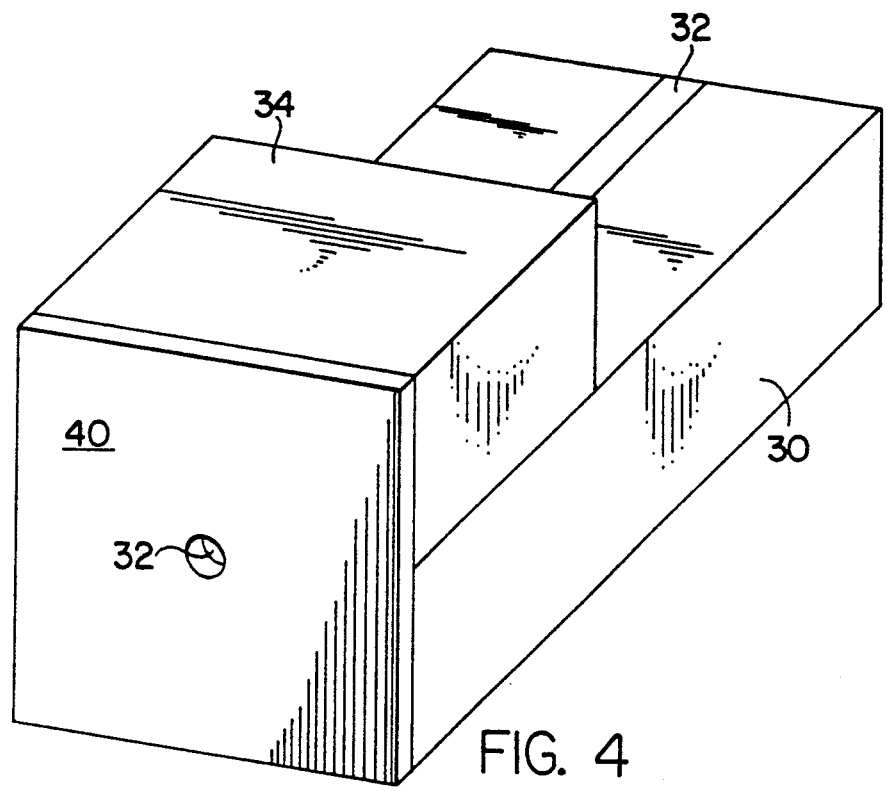
FIG. 4 is a perspective illustration of the block and IO chip of FIG. 3 each having an end face coated with solder.

In FIG. 1 is illustrated a perspective view of a portion of an optical fiber 10. The fiber 10 typically comprises a commercially available, single mode fiber, having a diameter in the range of, e.g., 0.005 to 0.01 mm. The fiber has an inner core portion 12, through which light is constrained to travel by an outer cladding portion 14.

The fiber is first prepared by cleaving a fiber end face 16 such that the end face 16 is normal to the optical axis of the fiber along the core 12. Next, the end face is coated with photoresist and the photoresist is exposed to light injected in the core at the other end of the fiber. The photoresist may comprise, e.g., a commercially available photosensitive polymer. The photoresist is typically applied to the fiber end face 16 by spray coating. After exposure through the core and processing, a protective film of photoresist is left only on the core and not on the cladding.

Next, a thin coating of a plating or wetting agent, such as an evaporative metal, is deposited on the entire surface of the fiber end face 16. The evaporative metal may be applied by, e.g., a known electron beam technique. Referring to FIG. 2, a layer of solder 20 is then applied to the fiber end face using the same electron beam technique. The evaporative metal applied previously to the end face acts to define the boundaries in which the solder will flow when subsequently melted, as described hereinafter. Finally, the remaining photoresist on the core is removed by immersing the end face in a solvent. Due to the photoresist remaining only on the core, the solvent removes the solder and plating only from the core, and not from the cladding portion on the end face of the fiber. Thus, the solder and plating pose no constraint to light travelling through the core. Further, the aforedescribed application and removal of photoresist on the end face of the fiber serves to precisely define the boundary of the outer perimeter of the core.

Illustrated in FIG. 3 is a substrate (chip) 30 of integrated optical material, typically lithium niobate or lithium tantalate. Formed in the chip 30 by known lithographic techniques is a waveguide 32, through which optical signal energy travels. Mounted on the chip is a block 34 comprising a similar IO material (i.e., lithium niobate or lithium tantalate). The block material is chosen similar to that of the chip so as to match the thermal expansion coefficients. The block 34 is positioned on the chip such that a planar end face 36 of the block is even with a planar end face 38 of the chip. Once positioned, the block is secured to the chip by means, e.g., of a layer of adhesive 40 (FIG. 5), such as a commercially available ultraviolet curable adhesive.

In a similar manner to the optical fiber described hereinbefore, the end faces 36,38 of the block and chip are spray coated with photoresist and exposed to light through the waveguide. After exposure and processing, a protective film of photoresist is left only on the waveguide and not on the remainder of the end faces. Next, a layer of evaporative metal and then a layer of solder 40 are applied to the block and chip end faces 36,38 by a similar electron beam technique. Finally, the remaining photoresist on the waveguide is removed by a solvent. This effectuates a removal of the evaporative metal and solder only on the waveguide and not on the end faces of the block and chip. In a similar manner to that of the fiber, the application and removal of photoresist to the end faces of the block and chip serves to precisely define the boundary of the outer perimeter of the waveguide 32.

Figure 5:
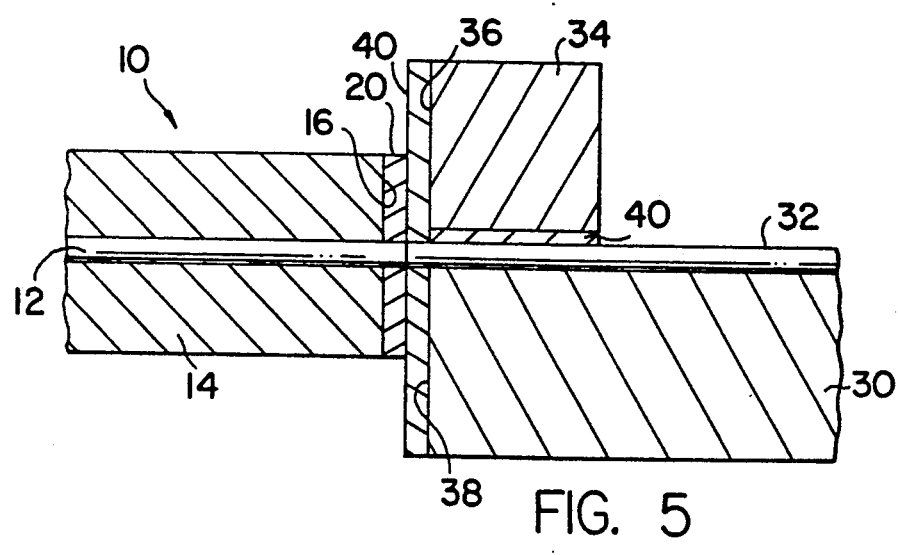
FIG. 5 is a cross sectional illustration of the fiber of FIG. 2 aligned with and mounted to the block and IO chip of FIG. 4 in accordance with the present invention.

Referring to FIG. 5, the solder coated end face 16 of the fiber 10 is positioned in front of the end faces 36,38 of the block and chip such that the optic axes of the core 12 and waveguide 32 are within several microns of the desired axial alignment. The fiber is then moved in the axial direction until the solder layer 20 on the fiber contacts the solder layer 40 on the block and chip. The solder layer 20 on the fiber and the layer 40 on the block and chip are then melted using, e.g., known microwave soldering apparatus. This results in bonding of the two solder layers together. However, as a result of the aforedescribed photoresist application and removal processes, the molten solder will not wet the exposed fiber core at the corresponding fiber end face 16, nor will the solder wet the waveguide at the block and chip end faces 36,38. Further, the resulting surface tension forces produced by the molten solder will precisely align the fiber and waveguide optical axes for improved coupling of light energy therebetween.

The method of the present invention has utility in achieving alignment of an optical fiber to a waveguide in an IO chip without the use of prior art external positioning equipment and apparatus to measure the optical transmission through the fiber/IO chip connection. The present invention is also inexpensive and time-saving, key factors in being able to produce IO devices such as fiber optic gyros in large quantities on a commercial basis.

As described with respect to FIG. 1, the fiber 10 is first prepared by cleaving a fiber end face 16. However, this step is not required in the practicing the broadest scope of the invention. The fiber end face may, if desired, have other shapes, e.g., spherical. Also, it is to be understood that methods other than those described herein may be used, in light of the teachings herein, for applying photoresist to the fiber and block and chip end faces, for developing the photoresist, for applying a layer of plating and a layer of solder to the fiber and block and chip end faces, for removing the plating and solder from the fiber core and waveguide, and for melting the solder.

All of the foregoing changes are irrelevant, it suffices for the broadest scope of the present invention that a method of aligning the optical axis in the core of an optical fiber with the optical axis in a waveguide imbedded in an integrated optical chip and of attaching the fiber to the chip includes the step of coating an end face of the fiber with a layer of solder such that the solder coating covers the cladding portion of the fiber without covering the core portion of the fiber; the integrated optical chip has a block of similar integrated optical material mounted to a surface of the chip such that a planar end face of the block is aligned with a planar end face of the chip; the end faces of the block/chip are coated with a layer of solder such that the solder coating covers the entire end face of the block/chip without covering the waveguide in the chip; the solder coated fiber end face is then brought in contact with the solder coated end face of the block/chip such that the core and waveguide are in approximate axial alignment; the solder layers on the fiber and block/chip end faces are then melted whereby the resulting surface tension forces are such that the optical axes of the core and waveguide are in precise alignment.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

I claim:

1. A method of aligning an optical axis in a core of an optical fiber with an optical axis in a waveguide imbedded in an integrated optical chip and of attaching the fiber to the chip, comprising the steps of:

coating an end face of the fiber with a layer of solder such that said fiber solder layer covers a cladding portion of the fiber without covering a core portion of the fiber;

mounting a block of integrated optical chip material to a surface of the chip such that a planar end face of the chip is aligned with a planar end face of the block to form a continuous end face;

coating said continuous end face with a layer of solder such that said continuous solder layer covers entirely said continuous end face without covering the waveguide;

placing said solder coated fiber end face in contact with said solder coated continuous end face such that the core and waveguide are in approximate axial alignment; and melting said solder coatings on said fiber end face and on said continuous end face, resulting surface tension forces bringing the optical axis of the fiber core into precise axial alignment with the optical axis of the waveguide in the chip.

2. The method of claim 1, before said step of coating an end face of the fiber with a layer of solder, further comprising the step of:

cleaving said fiber end face such that said fiber end face is normal to the optical axis of the fiber along the core.

3. The method of claim 1, before said step of coating an end face of the fiber with a layer of solder, further comprising the steps of:
coating said fiber end face with photoresist;
exposing said photoresist to light injected into the core from an opposite end of the fiber, whereby a protective film of photoresist remains only on the fiber core and not the cladding; and
plating said fiber end face with evaporative metal.

4. The method of claim 3, after said step of coating an end face of the fiber with a layer of solder, further comprising the step of:
removing said fiber solder layer and said evaporative metal plating from the fiber core, whereby said removal of said fiber solder layer and said evaporative coating defines an outer perimeter of the fiber core.

5. The method of claim 4, wherein said step of removing said fiber solder layer and said evaporative metal plating from the fiber core comprises the step of immersing said coated fiber end face in a solvent.

6. The method of claim 3, wherein said step of plating said fiber end face with evaporative metal includes the step of applying said evaporative metal to said fiber end face by electron beam.

7. The method of claim 1, before said step of coating said continuous end face of the block and chip with a layer of solder, further comprising the steps of:
coating said continuous end face with photoresist;
exposing said photoresist to light injected into the waveguide from an opposite end of the waveguide, whereby a protective film of photoresist remains only on the waveguide and not the remainder of said continuous end face; and
plating said continuous end face with evaporative metal.

8. The method of claim 7, after said step of coating said continuous end face with a layer of solder, further comprising the step of:
removing said continuous solder layer and said evaporative metal plating from said continuous end face in front of the waveguide, whereby said removal of said continuous solder layer and said evaporative coating serves to define an outer perimeter of the waveguide.

9. The method of claim 8, wherein said step of removing said continuous solder layer and said evaporative metal plating from said continuous end face further comprises the step of immersing said continuous end face in a solvent.

10. The method of claim 7, wherein said step of plating said continuous end face with evaporative metal includes the step of applying said evaporative metal to said continuous end face by electron beam.

11. The method of claim 1, wherein said step of melting said solder coatings on said fiber end face and on said continuous end face further comprises the step of heating said solder coatings on said fiber end face and on said continuous end face with microwave heating apparatus.

12. The method of claim 1, wherein said step of mounting a block of integrated optical chip material to a surface of the chip further comprises the step of applying an ultraviolet curable adhesive between the block and the chip.

13. Apparatus, comprising:
an optical fiber, having an inner core portion surrounded by an outer cladding portion, an end face of said fiber being coated with a layer of solder such that said solder layer covers a cladding portion of said fiber without covering a core portion of said fiber;
an integrated optical chip, having a waveguide imbedded in a surface thereof;
a block of integrated optical material, mounted to a surface of said chip such that a planar end face of said chip is aligned with a planar end face of said block to form a continuous end face, said continuous end face being coated with a layer of solder such that said solder layer covers entirely said continuous end face without covering said waveguide; characterized by:
said solder coated fiber end face being attached to said solder coated continuous end face such that said fiber core and said waveguide are in approximate axial alignment, said solder coatings on said fiber end face and on said continuous end face being melted whereby resulting surface tension forces bring said optical axis along said fiber core into precise axial alignment with said optical axis of said waveguide.

14. The apparatus of claim 13, wherein said optical fiber comprises single mode fiber.

15. The apparatus of claim 13, wherein said integrated optical chip comprises lithium niobate.

16. The apparatus of claim 13, wherein said integrated optical chip comprises lithium tantalate.

17. The apparatus of claim 13, wherein said block of integrated optical material comprises lithium niobate.

18. The apparatus of claim 13, wherein said block of integrated optical material comprises lithium tantalate.

* * * * *

UNITED STATES PATENT AND TRADEMARK OFFICE
CERTIFICATE OF CORRECTION

PATENT NO. : 5,073,002

DATED : December 17, 1991

INVENTOR(S) : Bruce D. Hockaday

It is certified that error appears in the above-identified patent and that said Letters Patent is hereby corrected as shown below:

On the Title page, In the Abstract:

line 5, "portio" should read --portion--.

Signed and Sealed this

Eighteenth Day of May, 1993

Attest:

MICHAEL K. KIRK

*Attesting Officer*  Acting Commissioner of Patents and Trademarks